United States Patent
Cuadra et al.

(10) Patent No.: US 7,675,761 B2
(45) Date of Patent: Mar. 9, 2010

(54) METHOD AND APPARATUS TO CONTROL TWO REGULATED OUTPUTS OF A FLYBACK POWER SUPPLY

(75) Inventors: Jason E. Cuadra, San Jose, CA (US); Simon Krugly, Santa Clara, CA (US); Peter Vaughan, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 267 days.

(21) Appl. No.: 11/809,375

(22) Filed: Jun. 1, 2007

(65) Prior Publication Data

US 2008/0298094 A1     Dec. 4, 2008

(51) Int. Cl.
    *H02M 3/335* (2006.01)
(52) U.S. Cl. .................................. 363/21.12
(58) Field of Classification Search .............. 363/21.12, 363/21.15, 21.18, 56.11, 97, 282
    See application file for complete search history.

(56) References Cited

U.S. PATENT DOCUMENTS

| | | | |
|---|---|---|---|
| 5,008,794 A | | 4/1991 | Leman |
| 5,400,239 A | | 3/1995 | Caine |
| 5,617,015 A | | 4/1997 | Goder et al. |
| 6,075,295 A | | 6/2000 | Li |
| 6,445,597 B1 | * | 9/2002 | Boylan et al. ............ 363/21.06 |
| 6,459,595 B2 | | 10/2002 | Assow |
| 6,483,726 B2 | | 11/2002 | Chen et al. |
| 6,552,917 B1 | | 4/2003 | Bourdillon |
| 7,088,594 B2 | * | 8/2006 | Sase et al. ..................... 363/16 |
| 2001/0028570 A1 | * | 10/2001 | Mullett et al. ............ 363/21.18 |
| 2008/0037294 A1 | * | 2/2008 | Indika de Silva et al. 363/21.12 |

OTHER PUBLICATIONS

"LM392 Low Power Operational Amplifier/Voltage Comparator", National Semiconductor Corporation, www.national.com, Aug. 2000, pp. 1-6.
"SB120-SB1100, Schottky Rectifiers", Fairchild Semiconductor Corporation, 2001, (3 pages).

(Continued)

*Primary Examiner*—Adolf Berhane
*Assistant Examiner*—Yemane Mehari
(74) *Attorney, Agent, or Firm*—Blakely Sokoloff Taylor & Zafman, LLP

(57) ABSTRACT

A flyback power supply method and apparatus is disclosed. An apparatus according to aspects of the present invention includes an energy transfer element having a primary winding and first and second output windings. The first and second output windings are coupled to produce first and second output values, respectively. A primary switch is coupled to the primary winding. A control circuit is coupled to the primary switch to regulate a sum of the first and second output values. A steering circuit having first and second output switches is also included. The first and second output switches are coupled to the first and second output windings, respectively, to regulate a ratio of the first output value to the second output value. The first output switch is coupled to block current through the first output winding and the second output switch is coupled to block current through second output winding. At least one of the first and second output switches is coupled to be closed when the primary switch is opened.

17 Claims, 3 Drawing Sheets

OTHER PUBLICATIONS

"LM158/LM258/LM358/LM2904, Low Power Dual Operational Amplifiers", National Semiconductor Corporation, www.national.com, Oct. 2005, pp. 1-25.

"PC817X Series, DIP 4pin General Purpose Photocoupler", Sheet No. D2-A03101EN, Sharp Corporation, Sep. 30, 2003, pp. 1-15.

Wen, Chau-Chun, et al., "Magamp Post Regulation for Flyback Converter", Power Electronics Laboratory, National Taiwan University, Taipei, Taiwan and Delta Power Electronics Center, Pudong, Shanghai, China, 0-7803-7067-8/01 2001 IEEE, pp. 333-338.

Ki, Wing-Hung, et al., "Single-Inductor Multiple-Output Switching Converters", Integrated Power Electronics Laboratory, The Hong Kong University of Science and Technology, Clear Water Bay, Hong Kong, SAR, China, 0-7803-7067-8/01, 2001 IEEE, pp. 226-231.

Bayer, Erich, et al., "A Single-Inductor Multiple-Output Converter With Peak Current State-Machine Control", Texas Instruments Deutschland GmbH, Freising, Germany, 0-7803-9547-6/06, 2006 IEEE, pp. 153-159.

"FINEMET® Alloy, Square Loop Cores, Technical Bulletin", Metglas®, www.metglas.com, Metglas®, Inc., 2004, pp. 1-2.

Barry, Noel, et al., "Coupled Magnetic Amplifiers in Forward Converter Topologies", IEEE Transactions on Power Electronics, vol. 14, No. 1, Jan. 1999, pp. 168-176.

Ma, Dongsheng, et al., "Single-Inductor Multiple-Output Switching Converters With Time-Multiplexing Control in Discontinuous Conduction Mode", IEEE Journal of Solid-State Circuits, vol. 38, No. 1, Jan. 2003, pp. 89-100.

Chakraborty, Sombuddha, et al., "A Novel Converter Topology for Multiple Individually Regulated Outputs", IEEE Transactions on Power Electronics, vol. 21, No. 2, Mar. 2006, pp. 361-369.

"PKS603-607, PeakSwitch® Family, Enhanced, Energy-Efficient, Off-Line Switcher IC With Super Peak Power Performance", Feb. 2007, pp. 1-24.

* cited by examiner

METHOD AND APPARATUS TO CONTROL TWO REGULATED OUTPUTS OF A FLYBACK POWER SUPPLY

BACKGROUND INFORMATION

1. Field of the Disclosure

The present invention relates generally to power supplies and, more specifically, the present invention relates to power supplies that use the flyback topology.

2. Background

Switching power supplies may be used for a multitude of purposes and applications. The flyback topology is a typical choice for switching power supplies with multiple outputs because it is often the solution with the lowest cost for many applications.

In many applications, it is often desirable for a power supply to provide output voltages that are invariant when the load current from the same output and the load currents from other outputs vary over a wide range. One example of an application where such invariant output voltages are desirable is a power supply for an audio amplifier. Audio amplifiers typically require two voltage sources of equal and opposite polarities with respect to a common reference, such as for example +40 volts and −40 volts.

It is difficult for a single flyback power supply that uses conventional methods of control to provide two invariant output voltages to audio amplifiers. Conventional methods regulate one output directly, and rely on good coupling between output windings of a transformer to keep another output voltage invariant to changes in the loads. Although the conventional method is adequate in many applications, it is unsatisfactory for audio amplifiers because of the special loading associated with audio signals.

The nature of audio signals causes the two output voltages to be loaded with unequal currents. It is common for one output to deliver a large current while the other output is delivering a small current. Imperfect coupling between windings of the transformer causes the voltage at the output with small current to rise unacceptably.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

Methods and apparatuses for implementing a flyback power supply with multiple regulated outputs are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As will be discussed below, various examples in accordance with the teachings of the present invention allow a single flyback power supply with an ordinary imperfect transformer to provide two output voltages that are invariant under the loading of an audio amplifier or similar widely varying loads. For instance, some examples of the present invention employ two control functions: a first control function determines the amount of energy that is provided to both outputs, and a second control function portions the energy between the outputs. In one example, the first control function regulates the sum of the output voltages while the second control function maintains the desired ratio of the two output voltages. In one example, the second control function uses a steering circuit to portion energy from a transformer so that the two output voltages are invariant with unequal loading from an audio amplifier in accordance with the teachings of the present invention.

Figure 1:
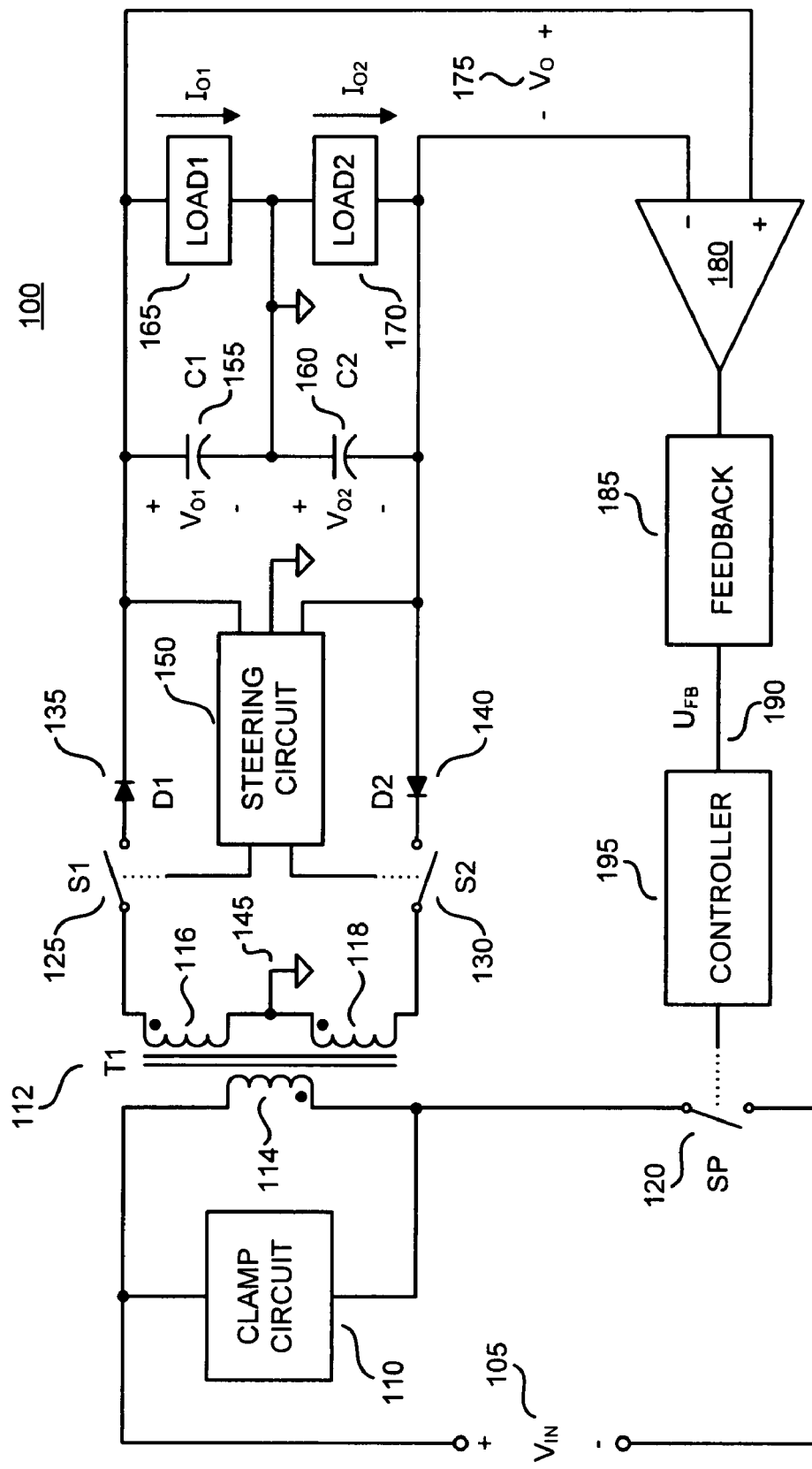
FIG. 1 is a functional block diagram schematic illustrating generally one example of a flyback power supply that shows some of the principal elements in accordance with the teachings of the present invention.

To illustrate, FIG. 1 is a functional block diagram that illustrates generally one example flyback power supply that shows some of the principal elements of the invention. A flyback power supply 100 receives an unregulated voltage $V_{IN}$ 105 that is coupled to an energy transfer element T1 112 and a primary switch SP 120. In the example of FIG. 1, the energy transfer element T1 112 is coupled between an input of the power supply and an output of the power supply.

In the example of FIG. 1, the energy transfer element T1 112 is illustrated as a transformer with three windings: a primary winding 114, a first output winding 116, and a second output winding 118. Output winding 116 and output winding 118 have a common return 145. In general, the transformer can have more than three windings, with additional windings to provide power to additional loads, to provide bias voltages, or to sense the voltage at a load in accordance with the teachings of the present invention.

In the illustrated example, a clamp circuit 110 is coupled to the primary winding 114 of the energy transfer element T1 112 to control the maximum voltage on the primary switch SP 120. Primary switch SP 120 is switched on (closed) and off (open) in response to one example of a controller circuit 195 in accordance with the teachings of the present invention. In one example, switch SP 120 is a transistor such as for example a power metal oxide semiconductor field effect transistor (MOSFET). In one example, controller 195 includes integrated circuits and discrete electrical components.

The operation of switch SP 120 produces pulsating currents in output windings 116 and 118, as permitted by the positions of respective secondary switches S1 125 and S2 130 to be rectified by respective rectifiers D1 135 and D2 140, and then filtered by respective capacitors C1 155 and C2 160 to produce respective output voltages $V_{O1}$ on capacitor C1 155 and $V_{O2}$ on capacitor C2 160. As shown in the illustrated example, capacitor C1 155 and capacitor C2 160 are coupled to the common output return 145 such that $V_{O1}$ is positive with respect to the output return 145 and $V_{O2}$ is negative with respect to the output return 145. Load impedances LOAD1 165 and LOAD2 170 are coupled respectively across output capacitors C1 155 and C2 160 to conduct respective output currents $I_{O1}$ and $I_{O2}$. In one example, load impedances LOAD1 165 and LOAD2 170 may represent an audio amplifier that receives power from the power supply 100.

In the illustrated example, controller circuit 195 receives a feedback signal $U_{FB}$ 190 from a feedback circuit 185. Feedback circuit 185 produces feedback signal $U_{FB}$ in response to an output sensing circuit 180 that senses the value of the composite output voltage $V_O$ 175 that is the sum of the two output voltages $V_{O1}$ and $V_{O2}$. In examples that have more than two output voltages, a sensing circuit may sense a composite output voltage of more than two output voltages. In one example, controller 195 operates primary switch SP 120 to substantially regulate the value of composite output voltage $V_O$ 175 to a value that is the sum of the desired values of $V_{O1}$ and $V_{O2}$. In one example, primary switch SP 120 operates at a substantially fixed frequency, varying the time the switch is closed during a switching period in a method known as pulse width modulation (PWM) to regulate the output voltage $V_O$ 175. In another example, the controller 195 causes primary switch SP 120 either to switch for a specified conduction time or to remain open during a switching period in a method known as on/off control to regulate the output voltage $V_O$ 175.

Steering circuit 150 senses the output voltages $V_{O1}$ and $V_{O2}$ across the capacitors C1 155 and C2 160 respectively. The switches S1 125 and S2 130 switch in response to steering circuit 150 to direct energy from the respective output windings 116 and 118 in order to maintain a desired ratio of the voltages $V_{O1}$ and $V_{O2}$. Thus, the values of the two output voltages $V_{O1}$ and $V_{O2}$ are regulated by the combined actions of the controller circuit 195 that regulates the sum of the two outputs and the steering circuit 150 that regulates the ratio of the output voltages $V_{O1}$ and $V_{O2}$.

At least one of the switches S1 125 and S2 130 is closed when the primary switch SP 120 is open. Switches S1 125 and S2 130 may open or close in any sequence or pattern that maintains the desired ratio of the voltages $V_{O1}$ and $V_{O2}$ as long as at least one of the switches is closed when the primary switch SP 120 is open. When the primary switch SP 120 opens, an open switch S1 125 will cause energy from the energy transfer element 112 to produce current in winding 118 through closed switch S2 130. If switch S2 is open when primary switch SP 120 opens, energy from the energy transfer element 112 will produce current in winding 116 through closed switch S1 125.

Thus, steering circuit 150 can steer energy from the energy transformer element 112 to one or the other of the two outputs. If both switches S1 125 and S2 130 are closed when the primary switch SP 120 opens, then energy from energy transfer element 112 divides between the two output windings 116 and 118 according to the coupling characteristics of the windings and the impedances the output circuits.

Figure 2:
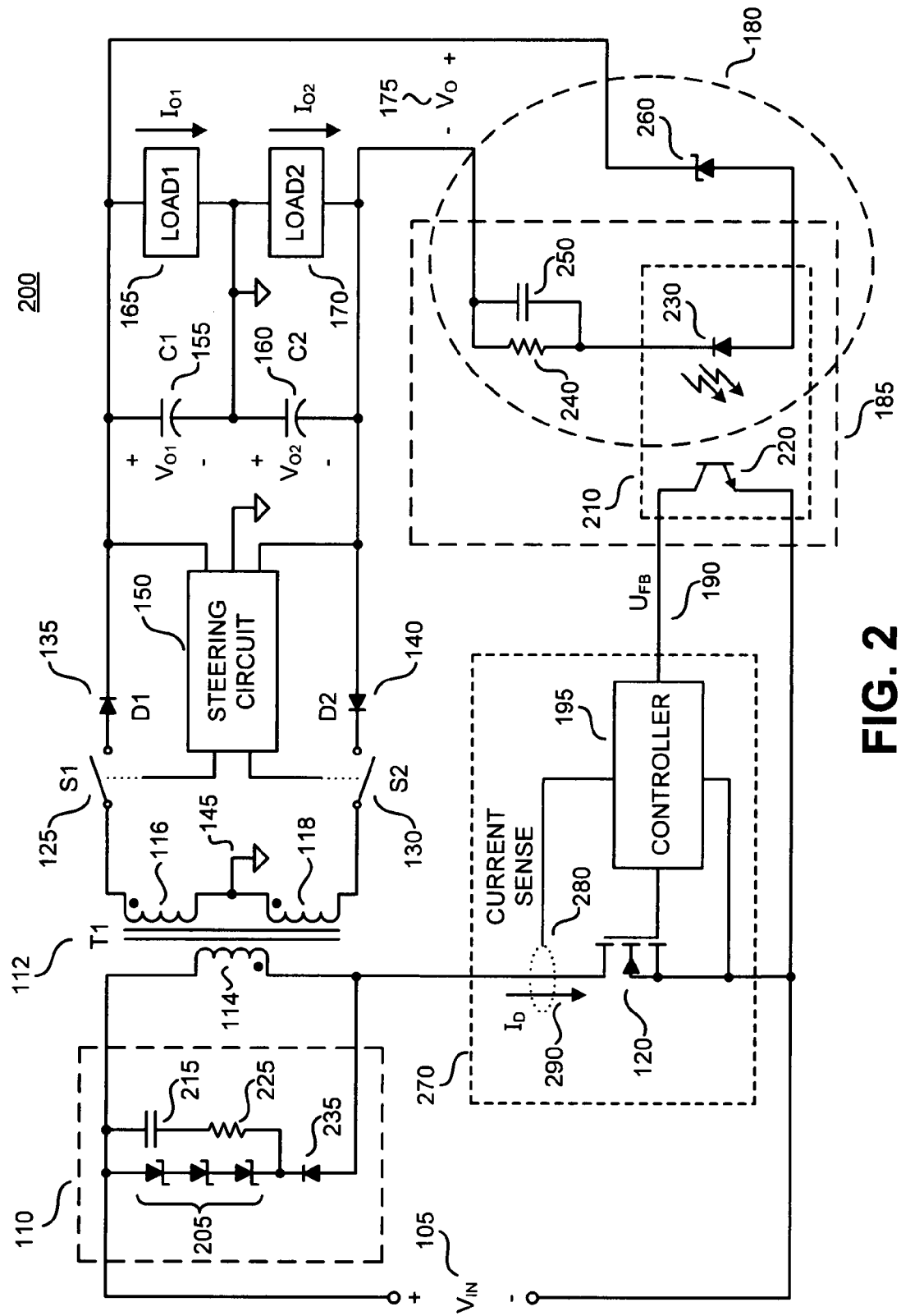
FIG. 2 is another functional block diagram schematic illustrating generally an example of a flyback power supply that shows some of the principal elements in greater detail in accordance with the teachings of the present invention.

FIG. 2 shows an example of the flyback power supply 100 depicted in FIG. 1 with greater detail. In particular, the example flyback power supply 200 illustrated in FIG. 2 has the primary switch SP 120 and controller circuit 195 included in an integrated circuit 270. In one example, integrated circuit 270 is a PKS607Y manufactured by Power Integrations, Inc., of San Jose, Calif. In integrated circuit 270, primary switch SP 120 is a MOSFET. In the example of FIG. 2, the control circuit 195 included in integrated circuit 270 receives a current sense signal 280 that senses the drain current $I_D$ 290 of the primary switch 120. The controller circuit 195 uses the current sense signal 280 to regulate the voltage $V_O$ 175 and to prevent damage to the primary switch 120. In one example of FIG. 2, the input voltage $V_{IN}$ 105 is approximately 170 volts and the composite output voltage $V_O$ 175 is approximately 80 volts.

As shown in the depicted example, the controller circuit 195 that is included in integrated circuit 270 receives feedback signal $U_{FB}$ 190 from the feedback circuit 185, which includes an optocoupler 210, a feedback resistor 240, and a feedback capacitor 250. Optocoupler 210 includes a phototransistor 220 and a light emitting diode (LED) 230. In one example, optocoupler 210 is a PC817D.

In one example, the output sensing circuit 180 includes a Zener diode 260, the LED 230 of the optocoupler 210, the feedback resistor 240, and the feedback capacitor 250. When the output voltage $V_O$ 175 exceeds the breakdown voltage of the Zener diode 260 plus the forward voltage of the LED 230, phototransistor 220 produces a feedback signal 190 that regulates the output voltage $V_O$ 175. In one example where $V_O$ 175 is approximately 80 volts, the Zener diode 260 may be realized with two 1N5259 Zener diodes, which have a nominal breakdown voltage of 39 volts. Feedback resistor 240 and feedback capacitor 250 are chosen to obtain the desired dynamic response of the regulated power supply. In one example, resistor 240 is 130 ohms and capacitor 250 is 100 nF.

In the illustrated example, clamp circuit 110 includes transient voltage suppression diodes 205, an ultra fast rectifier 235, a damping resistor 225 and a damping capacitor 215. In one example, the components of the clamp circuit 110 are chosen to match the properties the transformer T1 112. In one example, transient suppression diodes 205 are P6KE91, rectifier 235 is UF4005, resistor 225 is 150 ohms, and capacitor 215 is 470 pF.

Figure 3:
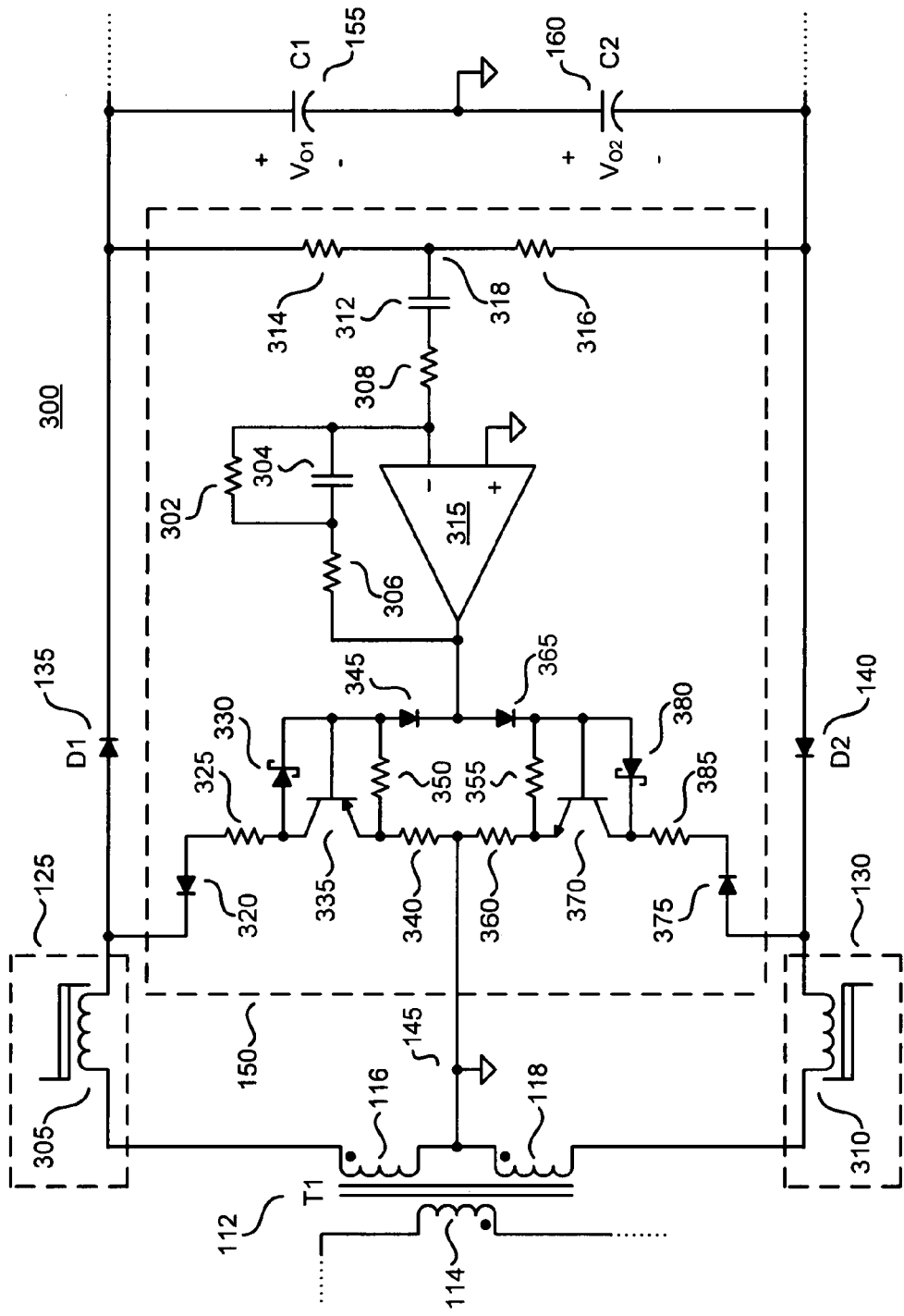
FIG. 3 is a schematic illustrating generally one example of a portion of a flyback power supply including an example of steering circuit in greater detail in accordance with the teachings of the present invention.

FIG. 3 shows an example section 300 of the power supply of FIG. 2 including the steering circuit 150 with greater detail. In the example of FIG. 3, saturable reactors 305 and 310 operate as magnetic amplifiers to perform the functions of switches 125 and 130 respectively. In one example, saturable reactors 305 and 310 are constructed with seven turns on an MP1305 toroid from Metglas, Inc. of Conway, S.C.

In the example steering circuit 150 of FIG. 3, either saturable reactor 305 or saturable reactor 310 may conduct current through diode 320 or diode 375, respectively, when the primary switch SP 120 is closed. In operation, the current conducted through diode 320 or diode 375 establishes an unsaturated flux density in either saturable reactor 305 or saturable reactor 310 when primary switch SP 120 is closed. Thus, either switch 125 or switch 130 may block current in diode D1 135 or D2 150 when primary switch SP 120 opens. In one example, steering circuit 150 is coupled so as not to allow diode 320 and diode 375 to conduct current at the same time. Thus, switch 125 and switch 130 cannot be open at the same time when primary switch SP 120 opens.

In the illustrated example, current through diode 320 is conducted through a current source that includes a current limiting resistor 325, a Schottky diode 330, a PNP transistor 335, a base to emitter resistor 350, blocking diode 345, and a gain setting resistor 340. Similarly, current through diode 375 is conducted through a current source that includes a current limiting resistor 385, a Schottky diode 380, an NPN transistor 370, a base to emitter resistor 355, a blocking diode 365, and a gain setting resistor 360. Thus, steering circuit 150 includes two current sources that conduct two mutually exclusive currents in accordance with the teachings of the present invention.

In one example, current limiting resistors 325 and 385 are 2.7 kohms, Schottky diodes 330 and 380 are SB160, PNP transistor 335 is 2N5401, NPN transistor 370 is MPSA42, base to emitter resistors 350 and 355 are 5.1 kohms, blocking diodes 345 and 365 are 1N4148 and gain setting resistors 340 and 360 are 510 ohms.

In the depicted example, operational amplifier 315 sets the current through either diode 320 or diode 375 to maintain the desired ratio between the output voltage $V_{O1}$ on capacitor C1 155 and the output voltage $V_{O2}$ on capacitor C2 160 in accordance with the teachings of the present invention. In one example, operational amplifier 315 is an LM392 and resistors 314 and 316 set the desired ratio of the two voltages $V_{O1}$ and $V_{O2}$. In one example where $V_{O1}$ and $V_{O2}$ are each 40 volts, the resistors 314 and 316 are each 49.9 kohms to set a ratio of 1:1 for $V_{O1}$:$V_{O2}$. The ratio of the turns on the winding 116 to the turns on winding 118 of energy transfer element 112 is typically the desired ratio of output voltage $V_{O1}$ to output voltage $V_{O2}$. Resistors 306, 302, and 308 with capacitors 304 and 312 determine the desired dynamic behavior of the steering circuit 150.

As shown in the example, capacitor 312 provides AC coupling of the voltage at the junction 318 of resistors 314 and 316 so that the steering circuit 150 opens switch 125 or switch 130 only under conditions of dynamic loading. The voltage at the junction 318 of resistors 314 and 316 is related to the ratio between the output voltages $V_{O1}$ and $V_{O2}$. In the example of FIG. 3, the voltage at the junction 318 is substantially equal to the reference voltage of the common return 145 when the ratio of $V_{O1}$:$V_{O2}$ is the desired ratio. In the example of FIG. 3, the voltage at the junction 318 is greater than the reference voltage 145 when the ratio $V_{O1}$:$V_{O2}$ is greater than the desired ratio, and the voltage at the junction 318 is less than the reference voltage 145 when the ratio $V_{O1}$:$V_{O2}$ is less than the desired ratio in accordance with the teachings of the present invention.

Therefore, example applications in accordance with the teachings of the present invention may include a steering circuit, such as those described above, which may be employed in combination with, for example, magnetic amplifiers and two independent control circuits. In such an example, one control circuit regulates the sum of two output voltages and the other control circuit uses the steering circuit to regulate the ratio of the two output voltages. The simple arrangement of the complimentary current sources driven by the operational amplifier prevents the saturable reactors from blocking current in both windings at the same time. If current were to be blocked in both windings at the same time, energy would be diverted to the clamp circuit 110 instead of to an output, resulting in undesirable power dissipation in the clamp circuit 110.

One benefit seen in the example arrangements in accordance with the teachings of the present invention over known alternatives is that the example circuits are simple, efficient, and low cost. The saturable reactors for the magnetic amplifiers may be chosen to block only a small amount of energy from leakage inductance that appears as a voltage across the magnetic amplifier for a short time after the primary switch turns off.

In one example, the operational amplifier discussed above in FIG. 3 is AC coupled because audio amplifiers are usually insensitive to the DC value of the power supply voltage as long as it is within its specified range. Audio amplifiers often respond unfavorably to dynamic variations of the power supply voltage, particularly at audio frequencies. Therefore, in most power supplies for audio amplifiers the change in output voltage is a greater concern than the regulation of the average DC value.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A flyback power supply circuit, comprising:
    an energy transfer element including a primary winding and first and second output windings coupled to produce first and second output values, respectively;
    a primary switch coupled to the primary winding;
    a control circuit coupled to the primary switch to regulate a sum of the first and second output values; and
    a steering circuit including first and second output switches coupled to the first and second output windings, respectively, wherein the steering circuit is coupled to sense both the first output value and the second output value and wherein the steering circuit is responsive to a ratio of the first output value to the second output value to regulate the ratio of the first output value to the second output value, wherein the first output switch is coupled to block current through the first output winding and the second output switch is coupled to block current through second output winding, wherein at least one of the first and second output switches is coupled to be closed when the primary switch is opened.

2. The flyback power supply circuit of claim 1 wherein the primary switch comprises a transistor.

3. The flyback power supply circuit of claim 1 wherein the primary switch and the controller are included in an integrated circuit.

4. The flyback power supply circuit of claim 1 wherein the first and second outputs comprise first and second output voltages, respectively.

5. The flyback power supply circuit of claim 1 wherein the first and second output switches comprise first and second magnetic amplifiers, respectively.

6. The flyback power supply circuit of claim 5 wherein the steering circuit further comprises:
    first and second current sources coupled to the first and second magnetic amplifiers, respectively, to provide mutually exclusive currents to the first and second magnetic amplifiers; and
    an operational amplifier coupled to the first and second current sources.

7. The flyback power supply circuit of claim 6 wherein the operational amplifier is AC coupled to a signal responsive to the ratio of the first output value to the second output value.

8. A method of regulating a first output and a second output of a flyback power supply, comprising:
   regulating a sum of a first output value of the first output and a second output value of the second output;
   sensing the first output value and the second output value;
   regulating a ratio of the first output value of the first output to the second output value of the second output in response to a signal representative of the ratio of the first output value of the first output to the second output value of the second output; and
   selectively blocking current through an energy transfer element of the flyback power supply to maintain the ratio of the first output value of the first output to the second output value of the second output.

9. The method of claim 8 wherein regulating the sum of the first output value of the first output and the second output value of the second output comprises switching a primary switch of the flyback power supply in response to the sum of the first output value of the first output and the second output value of the second output.

10. The method of claim 8 wherein regulating the sum of the first output value of the first output and the second output value of the second output comprises switching a transistor coupled to a primary winding of the flyback power supply in response to the sum of the first output value of the first output and the second output value of the second output.

11. The method of claim 8 wherein regulating the sum of the first output value of the first output and the second output value of the second output comprises regulating the sum of a first output voltage at the first output and a second output voltage at the second output.

12. The method of claim 8 wherein regulating the ratio of the first output value of the first output to the second output value of the second output comprises switching first and second output switches coupled to first and second output windings the flyback power supply in response to the ratio of the first output value of the first output to the second output value of the second output.

13. The method of claim 8 wherein regulating the ratio of the first output value of the first output to the second output value of the second output comprises switching first and second magnetic amplifiers coupled to first and second output windings the flyback power supply in response to the ratio of the first output value of the first output to the second output value of the second output.

14. The method of claim 8 wherein selectively blocking current through an energy transfer element of the flyback power supply comprises selectively switching first and second output switches coupled to first and second output windings of the flyback power supply to control current through the first and second output windings in response to the ratio of the first output value of the first output to the second output value of the second output.

15. The method of claim 14 wherein selectively switching first and second output switches coupled to first and second output windings such that at least one of the first and second output switches is coupled to be closed when a primary switch coupled to a primary winding of the flyback power supply is opened.

16. A flyback power supply circuit, comprising:
   an energy transfer element including a primary winding and first and second output windings coupled to produce first and second output values, respectively;
   a primary switch coupled to the primary winding;
   a control circuit coupled to the primary switch to regulate a sum of the first and second output values; and
   a steering circuit including first and second output switches coupled to the first and second output windings, respectively, to regulate a ratio of the first output value to the second output value, wherein the first output switch is coupled to block current through the first output winding and the second output switch is coupled to block current through second output winding, wherein at least one of the first and second output switches is coupled to be closed when the primary switch is opened, wherein the first and second output switches comprise first and second magnetic amplifiers, respectively, and wherein the steering circuit further comprises:
      first and second current sources coupled to the first and second magnetic amplifiers, respectively, to provide mutually exclusive currents to the first and second magnetic amplifiers; and
      an operational amplifier coupled to the first and second current sources.

17. The flyback power supply circuit of claim 16 wherein the operational amplifier is AC coupled to a signal responsive to the ratio of the first output value to the second output value.

* * * * *